US012654155B2

(12) United States Patent
Han et al.

(10) Patent No.: US 12,654,155 B2
(45) Date of Patent: Jun. 16, 2026

(54) CATALYST FOR DECOMPOSING PERFLUORINATED COMPOUNDS AND METHOD OF MANUFACTURING THE CATALYST

(71) Applicant: SAMSUNG ELECTRONICS CO., LTD., Suwon-si (KR)

(72) Inventors: Joungwoo Han, Suwon-si (KR); Minkee Choi, Daejeon (KR); Seongyun Ryu, Asan-si (KR); Jongsan Chang, Suwon-si (KR); Myungwon Oh, Daejeon (KR); Seungjun Lee, Hwaseong-si (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 686 days.

(21) Appl. No.: 18/073,293

(22) Filed: Dec. 1, 2022

(65) Prior Publication Data

US 2023/0173462 A1 Jun. 8, 2023

(30) Foreign Application Priority Data

Dec. 2, 2021 (KR) ........................ 10-2021-0171196

(51) Int. Cl.
*B01J 23/10* (2006.01)
*B01D 53/86* (2006.01)
(Continued)

(52) U.S. Cl.
CPC .......... *B01J 23/10* (2013.01); *B01D 53/8662* (2013.01); *B01J 21/04* (2013.01); *B01J 27/02* (2013.01);
(Continued)

(58) Field of Classification Search
None
See application file for complete search history.

(56) References Cited

U.S. PATENT DOCUMENTS 6,855,305 B2 * 2/2005 Kanno .................... C01B 7/191
423/244.1
7,261,868 B2 8/2007 Kanno et al.
(Continued)

FOREIGN PATENT DOCUMENTS

CN 105289672 B 2/2018
JP 2008-142696 A 6/2008
(Continued)

OTHER PUBLICATIONS

Ichikawa et al. Hydrolysis of CF4 over alumina-based binary metal oxide catalysts. Applied Catalysis B: Environmental 40, pp. 81-91. https://www.sciencedirect.com/science/article/pii/S0926337302001431 (Year: 2002).*
(Continued)

*Primary Examiner* — Jelitza M Perez
(74) *Attorney, Agent, or Firm* — Sughrue Mion, PLLC

(57) ABSTRACT
A catalyst for decomposing perfluorinated compounds includes an alumina carrier, at least one metal carried on the alumina carrier and selected from the group consisting of Zn, Ni, W, Zr, Ti, Ga, Nb, Co, Mo, V, Cr, Mn, Fe, and Cu, S carried on the alumina carrier, and rare-earth metals carried on the alumina carrier.

16 Claims, 7 Drawing Sheets

1000

(51) Int. Cl.
   *B01J 21/04*       (2006.01)
   *B01J 27/02*       (2006.01)
   *B01J 37/00*       (2006.01)
   *B01J 37/02*       (2006.01)
   *B01J 37/03*       (2006.01)
   *B01J 37/08*       (2006.01)

(52) U.S. Cl.
   CPC ....... *B01J 37/0009* (2013.01); *B01J 37/0221*
   (2013.01); *B01J 37/0236* (2013.01); *B01J*
   *37/03* (2013.01); *B01J 37/088* (2013.01);
   *B01D 2255/2063* (2013.01); *B01D 2255/20792*
   (2013.01); *B01D 2257/2066* (2013.01)

(56) References Cited

U.S. PATENT DOCUMENTS

| | | | | |
|---|---|---|---|---|
| 7,294,315 | B1 * | 11/2007 | Kanno | ..................... B01J 23/70 |
| | | | | 422/177 |
| 9,321,039 | B2 | 4/2016 | Choi et al. | |
| 2006/0024226 | A1 | 2/2006 | Park et al. | |
| 2009/0155154 | A1 | 6/2009 | Yen et al. | |
| 2020/0222885 | A1 | 7/2020 | Moon et al. | |

FOREIGN PATENT DOCUMENTS

| | | | |
|---|---|---|---|
| KR | 10-0461758 | B1 | 12/2004 |
| KR | 10-1325211 | B1 | 11/2013 |
| KR | 10-1406198 | B1 | 6/2014 |
| KR | 10-1867507 | B1 | 6/2018 |
| KR | 10-1869375 | B1 | 7/2018 |
| KR | 10-2000215 | B1 | 7/2019 |
| KR | 10-2020-0086983 | A | 7/2020 |
| KR | 10-2021-0020982 | A | 2/2021 |
| WO | 2020/130748 | A1 | 6/2020 |

OTHER PUBLICATIONS

Song et al. The Catalytic Decomposition of CF4 over Ce/Al2O3 modified by a Cerium Sulfate Precursor. Journal of Molecular Catalysis A: Chemical, 370, pp. 50-55. https://www.sciencedirect.com/science/article/pii/S1381116912004177 (Year: 2012).*

El-Bahy et al., "Hydrolytic decomposition of $CF_4$ over alumina-based binary metal oxide catalysts: high catalytic activity of gallia-alumina catalyst," Elsevier, Catalysis Today, vol. 90, pp. 283-290, 2004.

Song et al., "The catalytic decomposition of $CF_4$ over Ce/$Al_2O_3$ modified by a cerium sulfate precursor," Elsevier, Journal of Molecular Catalysis A: Chemical, vol. 370, pp. 50-55, 2013.

Jeon et al., "Hydrolytic decomposition of PFCs over $AlPO_4$—$Al_2O_3$ catalyst," Chem. Commun. pp. 1244-1245, 2003.

El-Bahy et al., "Hydrolysis of $CF_4$ over alumina-based binary metal oxide catalysts," Elsevier, Applied Catalysis B: Environmental, vol. 40, pp. 81-91, 2003.

Takita et al., "Catalytic Decomposition of $CF_4$ over $AlPO_4$-Based Catalysts," Chemistry Letters, vol. 28, No. 5, pp. 417-418, 1999, Total 3 pages.

Takita et al., "Catalytic decomposition of perfluorocarbons, Part II. Decomposition of $CF_4$ over $AlPO_4$-rare earth phosphate catalysts," Phys. Chem. Chem. Phys., vol. 1, pp. 4501-4504, 1999.

Xu et al., "The modification and stability of $\gamma$-$Al_2O_3$ based catalysts for hydrolytic decomposition of $CF_4$," Elsevier, Journal of Molecular Catalysis A: Chemical, vol. 266, pp. 131-138, 2007.

Xu et al., "A Strategy to Protect $Al_2O_3$-based PFC Decomposition Catalyst from Deactivation," Chemistry Letters vol. 34, No. 3, pp. 364-365, 2005.

* cited by examiner

CATALYST FOR DECOMPOSING PERFLUORINATED COMPOUNDS AND METHOD OF MANUFACTURING THE CATALYST

CROSS-REFERENCE TO RELATED APPLICATION

This application is based on and claims priority under 35 U.S.C. § 119 to Korean Patent Application No. 10-2021-0171196, filed on Dec. 2, 2021, in the Korean Intellectual Property Office, the disclosure of which is incorporated by reference herein in its entirety.

BACKGROUND

1. Field

The disclosure relates to a catalyst for decomposing perfluorinated compounds and a method of manufacturing the catalyst, and more particularly, to a catalyst for decomposing perfluorinated compounds including rare-earth metals and a method of manufacturing the catalyst.

2. Description of Related Art

The demand for semiconductors has increased according to the rapid development of the electronics industries. Accordingly, the amount of emitted perfluorinated compounds in the semiconductor manufacture process has also increased. Perfluorinated compounds have a stable chemical structure, and thus, they take a long time to be naturally decomposed. Accordingly, the accumulation of perfluorinated compounds may cause or contribute to global warming. Thus, there is a need to effectively process perfluorinated compounds.

SUMMARY

Provided is a catalyst for decomposing perfluorinated compounds that is capable of easily decomposing the perfluorinated compounds at low temperatures and maintaining a catalytic activity for a long duration of time.

In addition, provided is a method of manufacturing a catalyst for decomposing perfluorinated compounds that is capable of easily decomposing the perfluorinated compounds at low temperatures and maintaining a catalytic activity for a long duration of time.

Additional aspects will be set forth in part in the description which follows and, in part, will be apparent from the description, or may be learned by practice of the presented embodiments.

In accordance with an aspect of the disclosure, a catalyst for decomposing perfluorinated compounds includes at least one metal carried on the alumina carrier and selected from the group consisting of Zn, Ni, W, Zr, Ti, Ga, Nb, Co, Mo, V, Cr, Mn, Fe, and Cu; S carried on the alumina carrier; and rare-earth metals carried on the alumina carrier.

In accordance with an aspect of the disclosure, a method of manufacturing a catalyst for decomposing perfluorinated compounds includes forming a mixture of a precursor of at least one metal selected from the group consisting of Zn, Ni, W, Zr, Ti, Ga, Nb, Co, Mo, V, Cr, Mn, Fe, and Cu, a precursor of S, a precursor of rare-earth metals, and a precursor of Al; aging the mixture; drying the mixture; and plasticizing the mixture.

In accordance with an aspect of the disclosure, an apparatus for decomposing perfluorinated compounds includes a first processing device configured to pre-process a gas to be processed; a reactor including a heating portion and a catalyst portion, wherein the heating portion is configured to apply heat to the gas, and the catalyst portion includes a catalyst for decomposing perfluorinated compounds, wherein the reactor is configured to decompose a perfluorinated compound included in the gas, after the gas passes through the first processing device; and a second processing device configured to post-process the gas after the gas passes through the reactor, wherein the catalyst portion includes: an alumina carrier; at least one metal carried on the alumina carrier and selected from the group consisting of Zn, Ni, W, Zr, Ti, Ga, Nb, Co, Mo, V, Cr, Mn, Fe, and Cu; S carried on the alumina carrier; and rare-earth metals carried on the alumina carrier.

BRIEF DESCRIPTION OF DRAWINGS

The above and other aspects, features, and advantages of certain embodiments of the present disclosure will be more apparent from the following description taken in conjunction with the accompanying drawings in which:

FIG. 3 is a cross-sectional view of an apparatus for decomposing perfluorinated compounds, according to an example embodiment.

DETAILED DESCRIPTION

Figure 1:
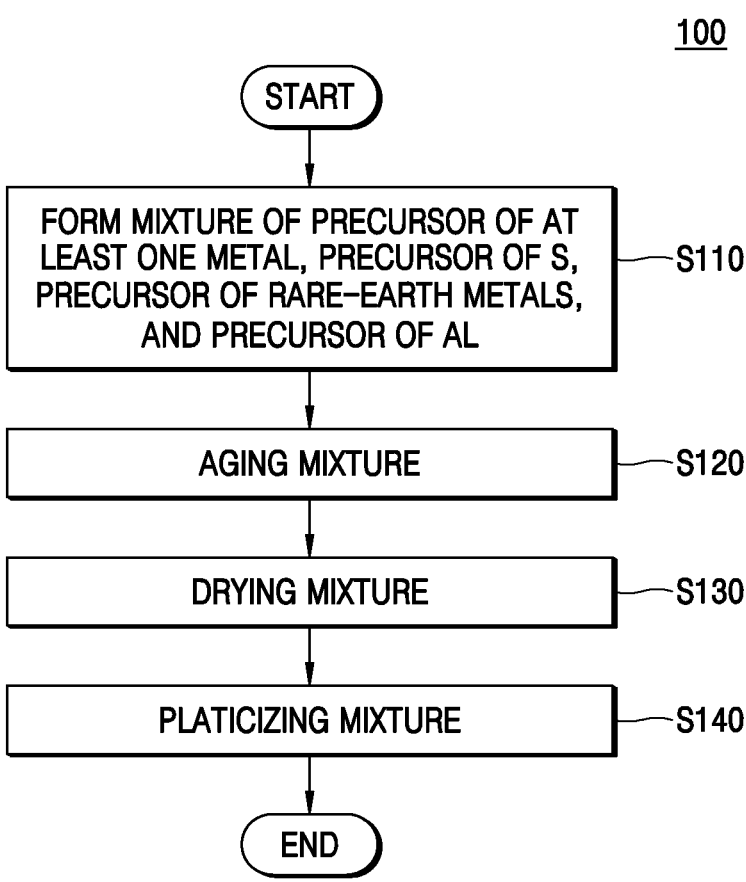
FIG. 1 is a flowchart of a method of manufacturing a catalyst for decomposing perfluorinated compounds, according to an example embodiment.

Hereinafter, embodiments are described in detail with reference to the accompanying drawings. In the drawings, the same reference numerals are used for the same components, and their descriptions are not repeatedly given.

According to an example embodiment, a catalyst for decomposing perfluorinated compounds is provided, the catalyst including an alumina carrier; at least one metal carried on the alumina carrier and selected from Zn, Ni, W, Zr, Ti, Ga, Nb, Co, Mo, V, Cr, Mn, Fe, and Cu; sulfur carried on the alumina carrier; and rare-earth metals carried on the alumina carrier. The catalyst for decomposing perfluorinated compounds may include sulfur, and thus, the efficiency of the catalyst for decomposing perfluorinated compounds may be improved, as described below. Also, the catalyst for decomposing perfluorinated compounds may include rare-earth metals, and thus, the structure of the catalyst may be stabilized.

According to an example embodiment, the at least one metal may be Zn. However, it is not limited thereto, and the at least one metal may include two or more metals, for example, Zn, and Cu.

According to an example embodiment, Al and the at least one metal may form a compound oxide. For example, when the at least one metal is Zn, Al and Zn may form an oxide, for example, $ZnAl_2O_4$.

According to an example embodiment, the rare-earth metals may include at least one rare-earth metal selected from Sc, Y, La, Ce, Pr, Nd, Pm, Sm, Eu, Gd, Dy, Ho, Er, Tm, Yb, and Lu. For example, the at least one rare-earth metal may be La. In some embodiments, the rare-earth metals may be at least one selected from La, Ce, and Y. However, it is not limited thereto, and the rare-earth metals may include, for example, at least two rare-earth metals selected from Sc, Y, La, Ce, Pr, Nd, Pm, Sm, Eu, Gd, Dy, Ho, Er, Tm, Yb, and Lu. For example, the at least two rare-earth metals may be La and Ce.

According to an example embodiment, a mole ratio of the alumina carrier, the at least one metal, sulfur, and the rare-earth metals may be 100:x:y:z, where 100 represents a quantity of the alumina carrier, x represents a quantity of the at least one metal, y represents a quantity of S, and z represents a quantity of the rare-earth metals, In embodiments, x may be within a range of 0.1 to 50, y may be within a range of 0.1 to 10, and z may be within a range of 0.1 to 10.

According to an example embodiment, x may be within ranges of 1 to 40, 5 to 30, or 10 to 20, y may be within ranges of 0.5 to 8, 1.5 to 7, or 2.5 to 5, and z may be within ranges of 0.1 to 5, 0.1 to 2, or 0.1 to 0.5.

When x, the mole ratio of the at least one metal, is less than 10 or greater than 20, the efficiency of the catalyst for decomposing perfluorinated compounds may be degraded, due to the presence of an oxide of the at least one metal.

When y, the mole ratio of sulfur, is less than 2.5 or greater than 5, the efficiency of the catalyst for decomposing perfluorinated compounds may be degraded.

When z, the mole ratio of the rare-earth metals, is less than 0.1, the phase transformation of an aluminum oxide into $\alpha$-$Al_2O_3$ cannot be controlled. Thus, the catalytic activity may rapidly deteriorate. In contrast, when z, the mole ratio of the rare-earth metals, is greater than 0.5, the efficiency of the catalyst for decomposing perfluorinated compounds may be degraded.

According to an example embodiment, the catalyst for decomposing perfluorinated compounds may be used to decompose at least one compound from among $CF_4$, $CHF_3$, $CH_2F_2$, $C_2F_4$, $C_2F_6$, $C_3F_6$, $C_3F_8$, $C_4F_8$, $C_4F_{10}$, $NF_3$, and $SF_6$. However, embodiments are not limited thereto. For example, the catalyst for decomposing perfluorinated compounds may be used to decompose cyclic aliphatic or aromatic perfluorinated compounds. Representative decomposition reactions of the perfluorinated compounds are as shown below by Reaction Formulas 1 through 5.

$$CF_4+2H_2O \rightarrow CO_2+4HF \qquad \text{[Reaction Formula 1]}$$

$$C_2F_6+3H_2O \rightarrow CO+CO_2+6HF \qquad \text{[Reaction Formula 2]}$$

$$CHF_3+H_2O \rightarrow CO+3HF \qquad \text{[Reaction Formula 3]}$$

$$SF_6+3H_2O \rightarrow SO_3+6HF \qquad \text{[Reaction Formula 4]}$$

$$2NF_3+3H_2O \rightarrow NO+NO_2+6HF \qquad \text{[Reaction Formula 5]}$$

Perfluorinated compounds generated in a semiconductor or a liquid crystal display (LCD) process may be global warming gases that have a high global warming index that is 1,000 times as high as or is higher than that of $CO_2$. Thus, it is desirable to dispose of perfluorinated compounds by processing the perfluorinated compounds. These perfluorinated compounds have a stable chemical structure. Thus, a catalyst may be used to process the perfluorinated compounds. However, due to phase transformation occurring during decomposition reaction, an aluminum oxide-based catalyst may be de-activated. However, the catalyst for decomposing perfluorinated compounds, according to an example embodiment, may include the rare-earth metals, and thus, may have acid resistance and thermal resistance. Thus, the efficiency of decomposing the perfluorinated compounds may be increased, and the stability of the catalyst may be improved.

According to an example embodiment, a catalyst for decomposing perfluorinated compounds may include an alumina carrier, Zn, S, and La and hydrolyze the perfluorinated compounds, wherein the alumina carrier and Zn form a compound oxide. The characteristics of the catalyst are as described above.

According to an example embodiment, a mole ratio of the alumina carrier, the at least one metal, S, and the rare-earth metals may be 100:x:y:z, wherein x may be within a range of 0.1 to 50, y may be within a range of 0.1 to 10, and z may be within a range of 0.1 to 10.

According to an example embodiment, x may be within ranges of 1 to 40, 5 to 30, or 10 to 20, y may be within ranges of 0.5 to 8, 1.5 to 7, or 2.5 to 5, and z may be within ranges of 0.1 to 5, 0.1 to 2, or 0.1 to 0.5.

The ranges of x, y, and z are the same as described above.

According to an example embodiment, a form of the catalyst for decomposing perfluorinated compounds according to an embodiment may be granular, such as a sphere, a pellet, or a ring, or the catalyst may be formed to have a honeycomb shape, etc.

FIG. 1 is a flowchart of a process 100 of manufacturing a catalyst for decomposing perfluorinated compounds, according to an example embodiment.

Referring to FIG. 1, the process 100 of manufacturing the catalyst for decomposing perfluorinated compounds, according to an example embodiment, may include: forming a mixture of a precursor of at least one metal selected from Zn, Ni, W, Zr, Ti, Ga, Nb, Co, Mo, V, Cr, Mn, Fe, and Cu, a precursor of S, a precursor of rare-earth metals, and a precursor of Al at operation S110. The process 100 may further include aging the mixture at operation S120. The process 100 may further include drying the mixture at operation S130. The process 100 may further include plasticizing the mixture at operation S140.

According to an example embodiment, the precursor of Al may include any one of boehmite, pseudo-boehmite, Al alkoxide, Al nitrate, Al fluoride, Al phosphate, Al chloride, and a mixture thereof, but embodiments are not limited thereto.

According to an example embodiment, the precursor of the at least one metal may include any one of metal nitride, metal nitrate, metal chloride, metal bromide, metal sulfide, metal sulfate, metal phosphate, and a mixture thereof, but embodiments are not limited thereto.

According to an example embodiment, the precursor of S may include any one of sulforic acid, ammonium sulfate, diammonium sulfate, and a mixture thereof, but embodiments are not limited thereto.

According to an example embodiment, the precursor of the rare-earth metals may include any one of nitrates of rare-earth metals, sulfates of rare-earth metals, nitrides of rare-earth metals, chlorides of rare-earth metals, sulfides of rare-earth metals, bromides of rare-earth metals, and a mixture thereof, but embodiments are not limited thereto.

In embodiments, operation S110, which may include forming the mixture of the precursor of the at least one metal selected from Zn, Ni, W, Zr, Ti, Ga, Nb, Co, Mo, V, Cr, Mn, Fe, and Cu, the precursor of S, the precursor of the rare-earth metals, and the precursor of Al, may further include, for example, wet precipitation or wet impregnation, but embodiments are not limited thereto.

According to an example embodiment, operation S120, which may include aging the mixture, may be conducted for a time of 12 hours at a temperature within a range of 20° C. to 100° C., but embodiments are not limited thereto. Through the aging of the mixture at operation S120, the structural stability of the catalyst for decomposing perfluorinated compounds may be improved.

According to an example embodiment, the aging of the mixture at operation S120 may further include peptization of alumina. The peptization refers to a process of giving a repulsive force to the precursor of Al by using an acid. The precursor of Al existing as a chunk is disassembled into smaller units through peptization, and thus, a surface area of the precursor of Al is increased. Thus, a catalyst including the precursor of Al having undergone peptization may have a greater activation area than a catalyst not including the precursor of Al having undergone peptization. Thus, the efficiency of the catalyst for decomposing perfluorinated compounds may be increased.

According to an example embodiment, the drying of the mixture at operation S130 may be performed for a time of 6 to 12 hours at a temperature within a range of 50° C. to 200° C. For example, the drying of the mixture at operation S130 may be performed for 6 hours at 100° C. However, embodiments are not limited thereto.

According to an example embodiment, the plasticizing of the mixture at operation S140 may be performed for a time of 6 to 12 hours at a temperature within a range of 700° C. to 900° C. When a thermal processing temperature is higher than 900° C. in operation S140, a phase of an Al oxide may be transformed, and a surface area of the Al oxide may be greatly reduced, and thus, a catalyst including the Al oxide may have a degraded efficiency for decomposing perfluorinated compounds.

Hereinafter, specific embodiments and comparative embodiments are described in more detail. However, embodiments are not limited to those described below.

EMBODIMENTS

Embodiment 1

Manufacture of Al—Zn—S—La Catalyst

A solution, in which an aqueous solution in which Zn nitrate and La nitrate are dissolved is mixed with S, is carried on boehmite and aged for 12 hours at room temperature. Thereafter, the mixture is dried for 6 hours at 100° C. Next, under oxygen, the mixture is plasticized for 6 hours at 700° C. at a heating rate of 2° C./minute to manufacture the Al—Zn—S—La catalyst. The mole ratio of Al, Zn, S, and La is 100:20:2.5:0.1.

Embodiment 2

Manufacture of Al—Zn—S—La Catalyst

The Al—Zn—S—La catalyst is manufactured by using the same process as Embodiment 1. The mole ratio of Al, Zn, S, and La is 100:20:1:0.1.

Embodiment 3

Manufacture of Al—Zn—S—La Catalyst

The Al—Zn—S—La catalyst is manufactured by using the same process as Embodiment 1. The mole ratio of Al, Zn, S, and La is 100:20:10:0.1.

Embodiment 4

Manufacture of Al—Zn—S—La Catalyst

The Al—Zn—S—La catalyst is manufactured by using the same process as Embodiment 1. The mole ratio of Al, Zn, S, and La is 100:20:2.5:1.

Comparative Embodiments

Comparative Embodiment 1

Manufacture of $\gamma$—Al$_2$O$_3$

Boehmite is plasticized for 6 hours at 700° C. at a heating rate of 2° C.; minute under oxygen.

Comparative Embodiment 2

Manufacture of Alumina Phosphate Catalyst

A phosphoric acid aqueous solution is carried on boehmite and aged for 12 hours at room temperature. Thereafter, the phosphoric acid aqueous solution is dried and plasticized by using the same method as Embodiment 1 to manufacture the alumina phosphate catalyst. The catalyst is manufactured to have a mole ratio of Al and P corresponding to 100:2.5. This is manufactured according to Embodiment 1 of Korean Patent Application No. 2004-0024775, the subject matter of which is incorporated by reference herein in its entirety.

Comparative Embodiment 3

Manufacture of Al—Zn Catalyst

An aqueous solution in which Zn nitrate is dissolved is carried on boehmite and aged for 12 hours at room temperature. Thereafter, the Zn nitrate aqueous solution is dried and plasticized by using the same method as Embodiment 1 to manufacture the Al—Zn catalyst. The catalyst is manufactured to have a mole ratio of Al and Zn corresponding to 100:20.

Comparative Embodiment 4

Manufacture of Al—Zn—P Catalyst

A solution in which an aqueous solution in which Zn nitrate is dissolved is mixed with phosphoric acid is carried on boehmite and aged for 12 hours at room temperature. Thereafter, the solution is dried and plasticized by using the same method as Embodiment 1 to manufacture the Al—Zn—P catalyst. The catalyst is manufactured to have a mole ratio of Al, Zn, and P corresponding to 100:20:2.5. This is manufactured according to Embodiment 2 of Korean Patent Application No. 2017-0108063, the subject matter of which is incorporated by reference herein in its entirety.

Comparative Embodiment 5

Manufacture of Al—Zn—S Catalyst

A solution in which an aqueous solution in which Zn nitrate is dissolved is mixed with S is carried on boehmite and aged for 12 hours at room temperature. Thereafter, the solution is dried and plasticized by using the same method as Embodiment 1 to manufacture the Al—Zn—S catalyst. The catalyst is manufactured to have a mole ratio of Al, Zn, and S corresponding to 100:20:2.5.

Experimental Embodiments

Experimental Embodiment 1

Measurement and Comparison Regarding the Efficiencies of Catalysts for Decomposing Perfluorinated Compounds An experiment is conducted to compare the efficiency of decomposing a perfluorinated compound ($CF_4$) among the catalysts according to Embodiments 1 through 4 and the catalysts according to Comparative Embodiments 1 through 5. To compare the efficiencies of decomposing the perfluorinated compound ($CF_4$), 1.5 g of each of the catalysts according to Embodiments 1 through 4 and the catalysts according to Comparative Embodiments 1 through 5 was taken, and used to perform a reaction in a fixed-bed continuous-flow reactor. The fixed-bed continuous-flow reactor is formed of an alloy of Inconel materials having durability for fluoric acid. To minimize the effect of heat and the material movement, each catalyst is formed to have about 50 to about 100 meshes to be used as a final catalyst. The $CF_4$ hydrolysis reaction is performed under conditions including WHSV of about 0.047/h, a temperature of about 550° C. to about 700° C., $P(CF_4)$ of about 0.67 kPa, $P(H_2O)$ of about 33.23 kPA, and P(Ar) of about 0.67 kPA, and a basic gas is He. As an internal standard, Ar is used. A reactant and a product are analyzed through a thermal conductivity detector (TCD), and the decomposition efficiency of Table 1 below is calculated according to Equation 1 below.

$$\text{The } CF4 \text{ decomposition rate (\%)} = \qquad \text{[Equation 1]}$$
$$\left( \frac{1 - CF4 \text{ concentration of outlet gas}}{CF4 \text{ concentration of inlet gas}} \right) \times 100$$

TABLE 1

| Reaction temperature (° C.) | Decomposition rate (%) | | |
|---|---|---|---|
| | 600 | 640 | 680 |
| Embodiment 1 | 66.10 | 91.13 | 100 |
| Embodiment 2 | 61.25 | 88.10 | 99.57 |
| Embodiment 3 | 61.35 | 90.51 | 100 |
| Embodiment 4 | 44.05 | 70.86 | 93.56 |
| Comparative Embodiment 1 | 42.43 | 71.62 | 96.36 |
| Comparative Embodiment 2 | 39.39 | 55.17 | 83.16 |
| Comparative Embodiment 3 | 54.55 | 83.70 | 98.92 |
| Comparative Embodiment 4 | 36.00 | 61.66 | 82.88 |
| Comparative Embodiment 5 | 67.21 | 91.58 | 100 |

As shown in Table 1 above, it is identified that the $CF_4$ decomposition rates of the catalysts according to Embodiments 1 through 4 are higher than the $CF_4$ decomposition rates of the catalysts according to Comparative Embodiments 1 through 4. To compare the catalysts according to Embodiments 1 through 3, the catalyst according to Embodiment 1, in which y, the mole ratio of S, is in the range of 2.5 through 5, has the highest efficiency of decomposing the perfluorinated compound. To compare the catalysts according to Embodiments 1 and 4, the catalyst according to Embodiment 1, in which z, the mole ratio of La, is in the range of 0.1 through 0.5, has a higher efficiency of decomposing the perfluorinated compound than the catalyst according to Embodiment 4. Hereinafter, the stability of the catalyst according to each of Embodiment 1, Comparative Embodiment 1, Comparative Embodiment 3, and Comparative Embodiment 5 is examined.

Experimental Embodiment 2

Measurement and Comparison Regarding Stability of Catalyst

An experiment is conducted to compare the stability among the catalysts according to Embodiment 1 and Comparative Embodiments 1, 3, and 5. To this end, each of the catalysts according to Embodiment 1 and Comparative Embodiments 1 and 3 is thermally processed for 6 hours at a temperature of 1100° C. under oxygen. Results regarding the thermal process are shown hereinafter in FIGS. 2A through 2D.

Figure 2A:
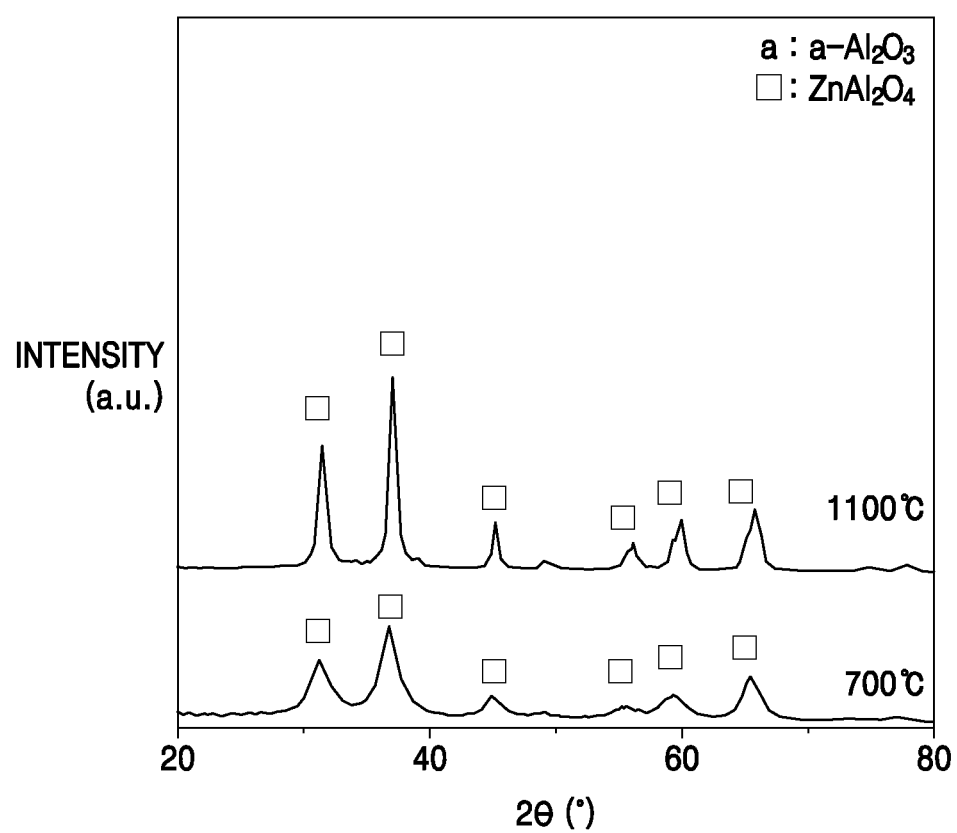
FIG. 2A is a graph showing an X-ray diffraction (XRD) pattern of a catalyst before and after heat treatment, according to Embodiment 1.
Figure 2B:
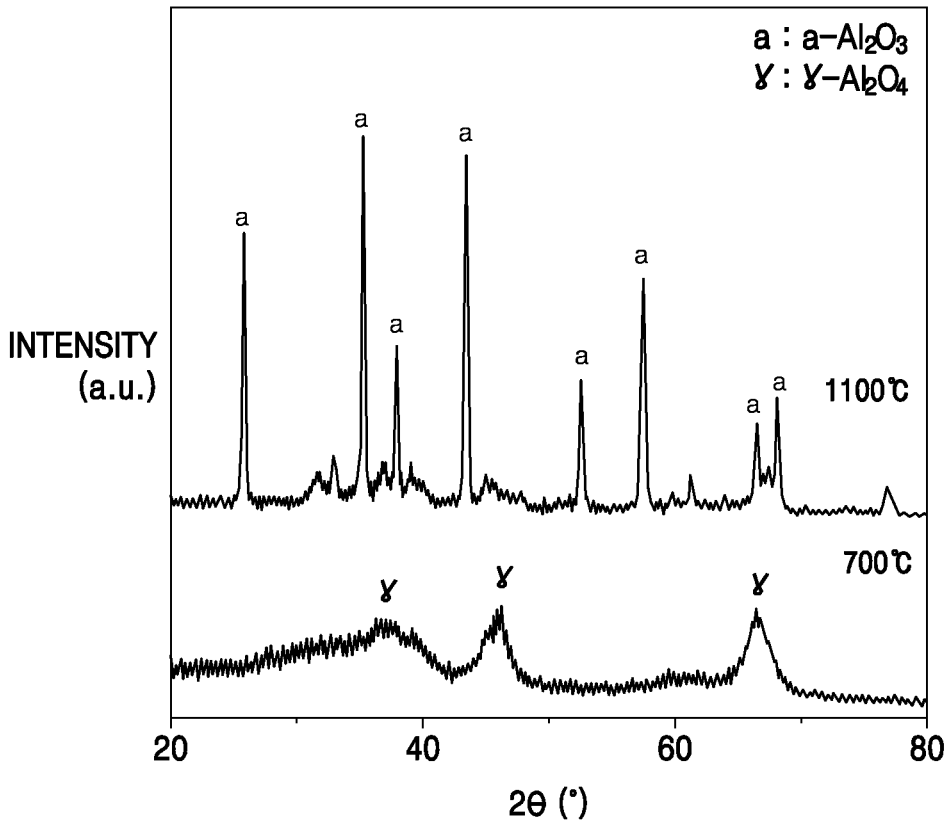
FIGS. 2B to 2D are graphs showing XRD patterns of catalysts before and after heat treatment, according to Comparative Embodiment 1, Comparative Embodiment 3, and Comparative Embodiment 5, respectively.
Figure 2C:
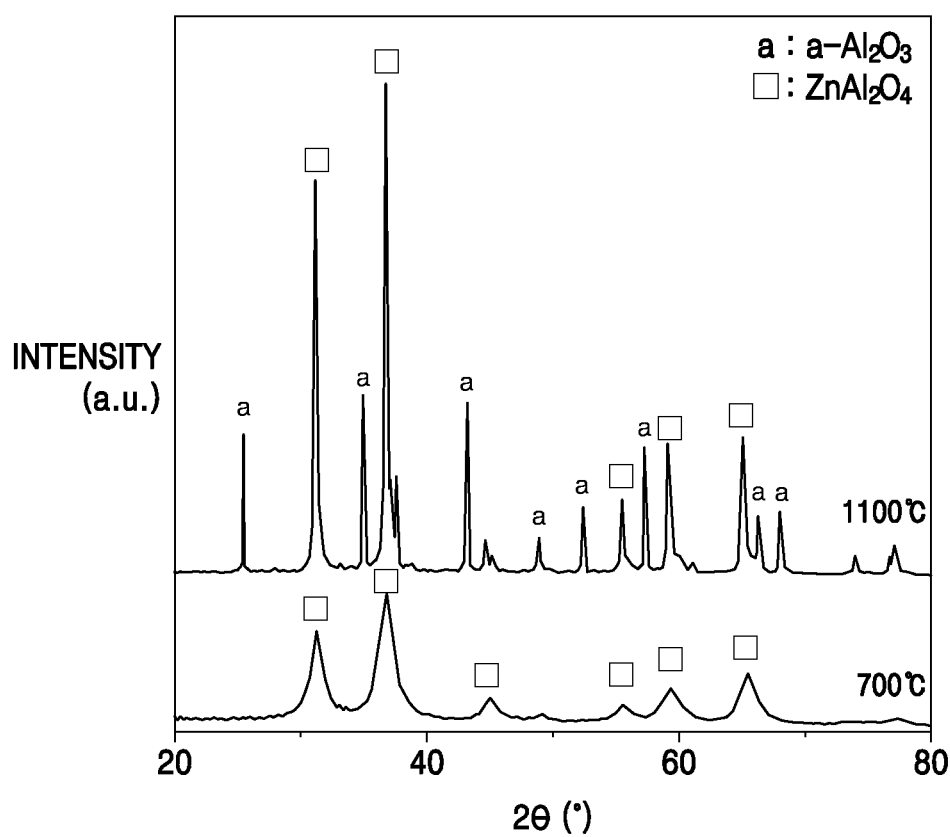
Figure 2D:
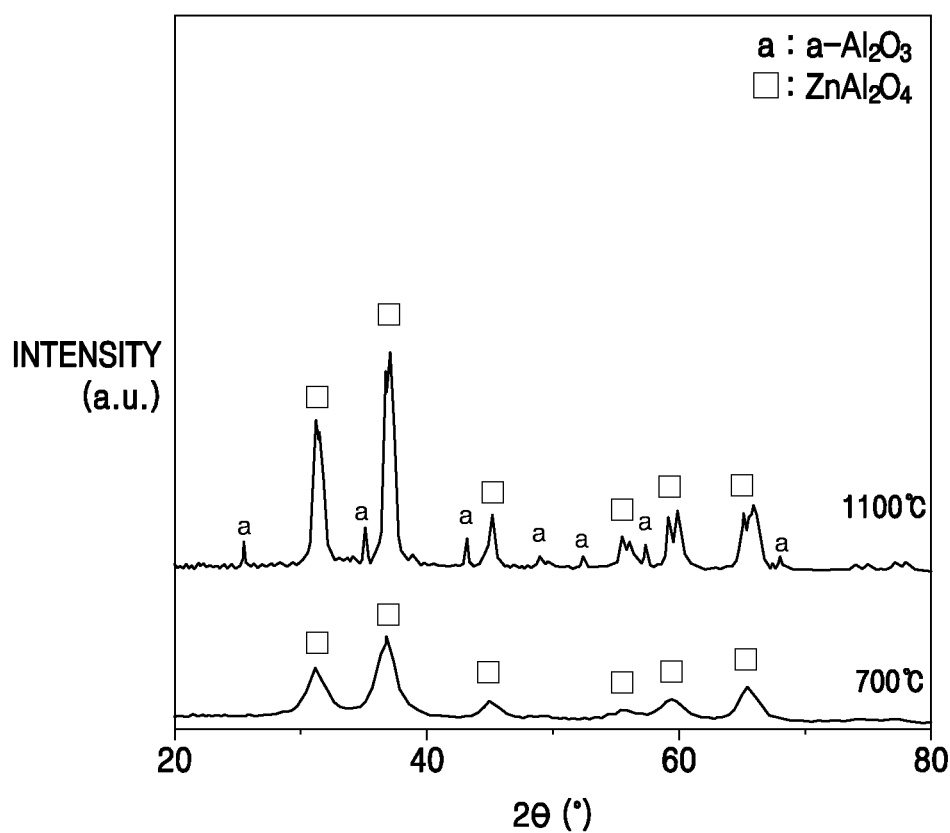

FIGS. 2A through 2D are graphs showing X-ray diffraction (XRD) patterns of catalysts according to heat treatment, according to an example embodiment and comparative embodiments. FIG. 2A is a graph showing the XRD pattern of the catalyst according to heat treatment, according to Embodiment 1, and FIGS. 2B through 2D are graphs showing the XRD patterns of the catalysts according to heat treatment, according to Comparative Embodiment 1, Comparative Embodiment 3, and Comparative Embodiment 5.

X axes of FIGS. 2A through 2D indicate an incident angle 2θ of an X-ray, and Y axes of FIGS. 2A through 2D indicate an intensity of the X-ray. Each of FIGS. 2A through 2D indicates forms of Al oxide at 700° C. and 1100° C.

Referring to FIG. 2A, in the case of the catalyst according to Embodiment 1, even after heat treatment is performed on the catalyst for 6 hours at the temperature of 1100° C., Al oxide included in the catalyst is not phase-transformed into α—$Al_2O_3$.

However, referring to FIGS. 2B through 2D, the catalysts according to Comparative Embodiments 1, 3, and 5 are thermally treated for 6 hours at the temperature of 1100° C., and Al oxides included in the catalysts are phase-transformed into α—$Al_2O_3$.

Decomposition of perfluorinated compounds is commonly performed at high temperatures. In this case, when steam and fluoric acid are present, γ—Al oxide included in a catalyst for decomposing perfluorinated compounds is easily phase-transformed into α—$Al_2O_3$. When the Al oxide is phase-transformed, a surface area and an activation point of the catalyst for decomposing perfluorinated compounds, in which the phase transformation occurs, are reduced, and thus, the catalyst for decomposing perfluorinated compounds is rapidly deactivated. With respect to Experimental Embodiment 2, the Al oxide included in the catalyst according to Embodiment 1 is not phase-transformed from γ—$Al_2O_3$ to α—$Al_2O_3$, even after heat treatment is performed on the catalyst for 6 hours at the temperature of 1100° C. Thus, compared with the catalysts according to Comparative Embodiments 1, 3, and 5, in which phase-transformation occurs according to heat treatment performed under the same condition, the catalyst according to Embodiment 1 has a higher heat resistance and a higher acid resistance.

That is, referring to Experimental Embodiments 1 and 2, the catalyst according to Embodiment 1 may decompose the perfluorinated compound more effectively than the catalysts according to Comparative Embodiments 1 through 4. Also, while the catalyst according to Comparative Embodiment 5 has a similar decomposition efficiency for the perfluorinated compound as the catalyst according to Embodiment 1, the catalyst according to Embodiment 1 may have a higher heat resistance and a higher acid resistance, and thus, may have a greater stability than the catalyst according to Comparative Embodiment 5.

Figure 3:
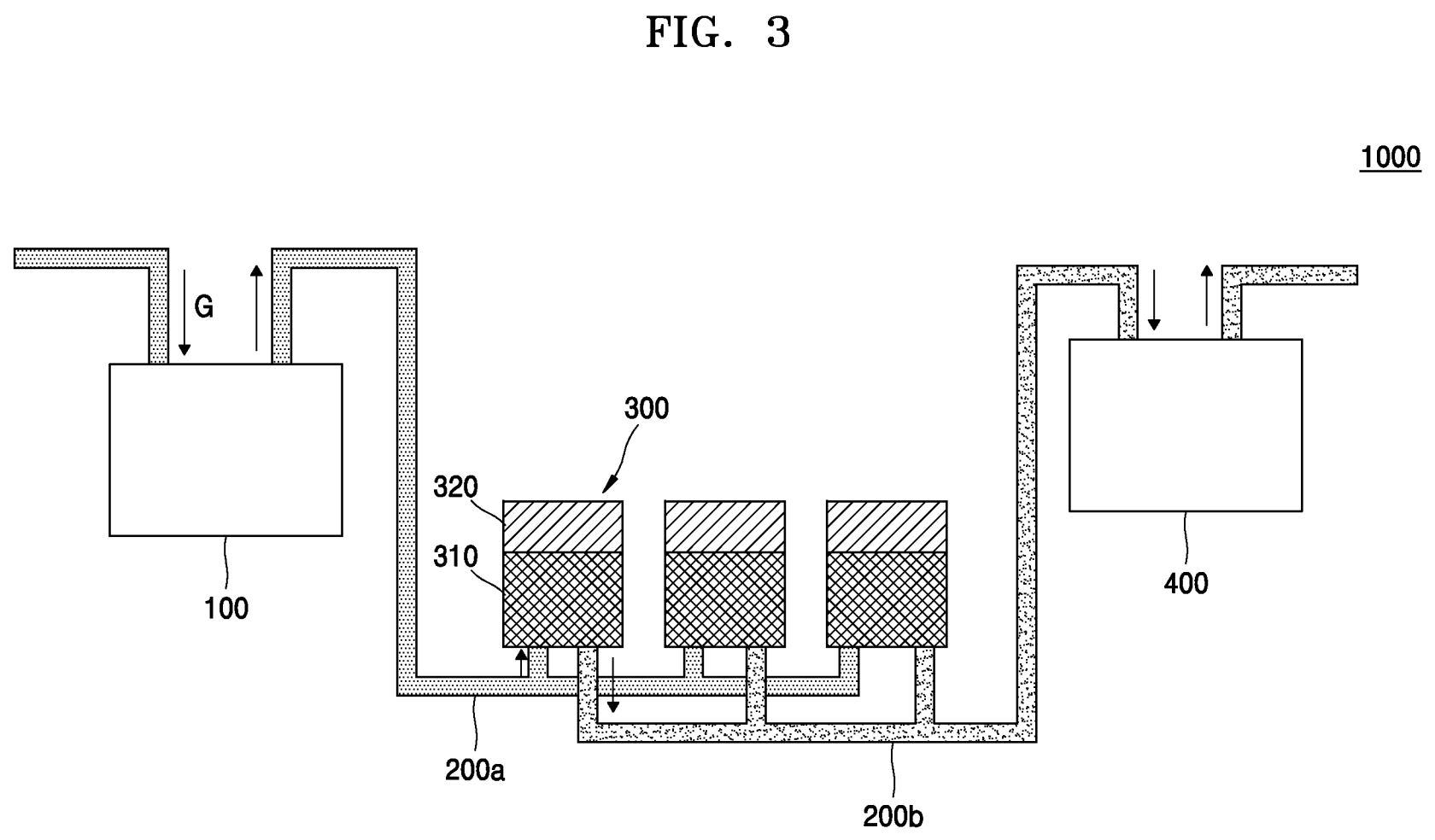

FIG. 3 is a cross-sectional view of an apparatus 1000 for decomposing perfluorinated compounds, according to an example embodiment. Arrows of FIG. 3 indicate a movement path of a gas G to be processed, the gas G including a perfluorinated compound.

Referring to FIG. 3, the apparatus 1000 for decomposing perfluorinated compounds may include a first processing device 100, a second processing device 400, a reactor 300, and a plurality of gas pipes 200*a* and 200*b*. The first processing device 100 may pre-process the gas G to be processed, the gas G including the perfluorinated compound. FIG. 3 illustrates one first processing device 100. However, embodiments are not limited thereto. For example, the first processing device 100 may include two or more devices, such as a filtering device, a collecting device, etc.

The reactor 300 may include a heating portion 310, and a catalyst portion 320. The reactor 300 may include a plurality of reactors, but embodiments are not limited thereto. When the reactor 300 includes a plurality of reactors, the reactors 300 may be connected with each other in parallel. The heating portion 310 may heat the gas G to be processed, the gas G including the perfluorinated compound, in order to decompose the perfluorinated compound. The heating portion 310 may use, for example, a heating jacket or a heat storage, but embodiments are not limited thereto. The heat storage may include, for example, at least one of metal oxide, metal nitride, metal carbide, metal hydroxide, and a mixture thereof. The catalyst portion 320 may include a catalyst for decomposing perfluorinated compounds. The catalyst for decomposing perfluorinated compounds may include: an alumina carrier; at least one metal carried on the alumina carrier and selected from Zn, Ni, W, Zr, Ti, Ga, Nb, Co, Mo, V, Cr, Mn, Fe, and Cu; S carried on the alumina carrier; and rare-earth metals carried on the alumina carrier. For example, the catalyst for decomposing perfluorinated compounds may include: the alumina carrier, Zn carried on the alumina carrier, S carried on the alumina carrier, and La carried on the alumina carrier. According to an example embodiment, a mole ratio of the alumina carrier, the at least one metal, S, and the rare-earth metals may be 100:x:y:z, wherein x may be within a range of 10 to 20, y may be within a range of 2.5 to 5, and z may be within a range of 0.1 to 0.5.

The second processing device 400 may post-process the gas G to be processed having passed through the reactor 300. The second processing device 400 may be a wet processing device to eliminate a byproduct of decomposition reaction, such as HF, by using, for example, $H_2O$ or an alkali solution, such as KOH, NaOH, etc., but embodiments are not limited thereto.

The plurality of gas pipes 200*a* may be paths to move the gas G to be processed from the first processing device 100 to the reactor 300, and the plurality of gas pipes 200*b* may be paths to move the gas G to be processed from the reactor 300 to the second processing device 400.

Figure 4:
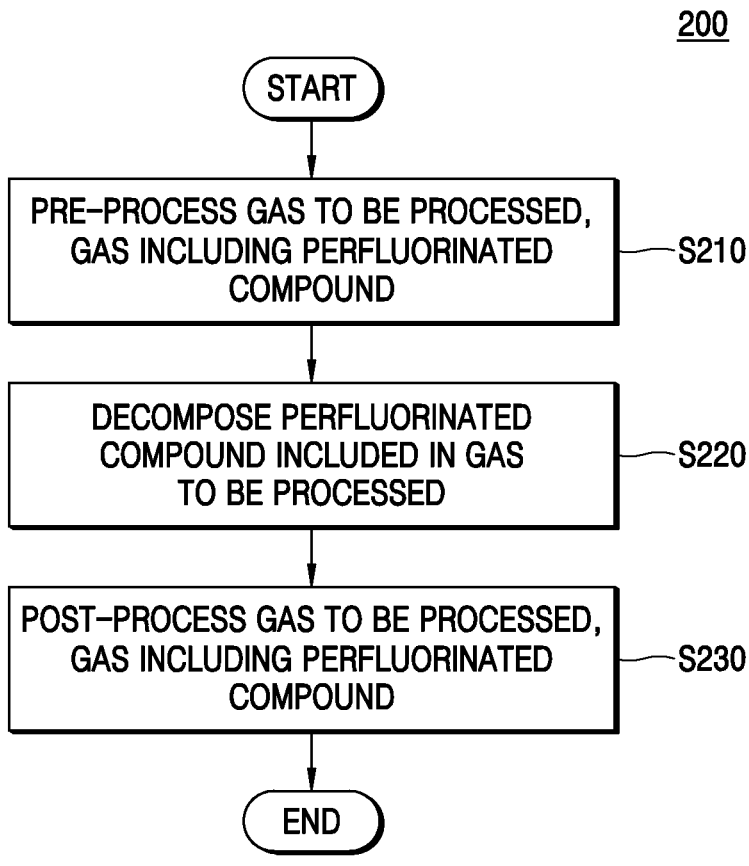
FIG. 4 is a flowchart of a method of decomposing perfluorinated compounds using a catalyst, according to an example embodiment.

FIG. 4 is a flowchart of a method of decomposing perfluorinated compounds using a catalyst for decomposing perfluorinated compounds, according to an example embodiment.

Referring to FIG. 4, at operation S210 the process 200 of decomposing perfluorinated compounds may include pre-processing a gas to be processed, the gas including a perfluorinated compound. At operation S220, the process 200 may further include decomposing the perfluorinated compound included in the gas to be processed. At operation S230, the process 200 may further include post-processing the gas to be processed, the gas including the perfluorinated compound.

Operation S210, which may include pre-processing of the gas to be processed, the gas including the perfluorinated compound, may further include various operations, such as wet pre-processing, filtering, collecting, etc. When the pre-processing of the gas at operation S210 includes wet pre-processing, a portion of the perfluorinated compound may be eliminated through this wet pre-processing. When the pre-processing of the gas at operation S210 includes filtering, particles included in the gas to be processed may be eliminated. To perform filtering, for example, a wet dense filter, etc. may be used, but it is not limited thereto. When the pre-processing of the gas at operation S210 includes collecting, the particles included in the gas to be processed may be charged, collected by a collecting plate, and eliminated from the gas to be processed. According to an example embodiment, the pre-processing of the gas at operation S210 may include two or more operations. For example, the pre-processing of the gas at operation S210 may sequentially include wet pre-processing and filtering. Through this pre-processing of the gas at operation, various materials included in the gas to be processed, for example, HCl, HF, $SiO_2$, etc., may be eliminated.

Operation S220, which may include decomposing the perfluorinated compound included in the gas to be processed, may further include heating using a heat storage and decomposing using a catalyst. Through decomposition reaction using the catalyst, the perfluorinated compound may be decomposed according to Reaction Formulas 1 through 5 described above. Thus, acid vapor, such as HF, is generated as a byproduct. The decomposing at operation S220 may further include cooling the gas to be processed, thereafter. The catalyst for decomposing perfluorinated compounds according to an example embodiment may have a higher decomposition efficiency for perfluorinated compounds than previous catalysts and may have a higher acid and heat resistance, and thus, may have a greater stability than the previous catalysts. Accordingly, the catalyst for decomposing perfluorinated compounds according to an example embodiment may have a longer replacement cycle compared with the previous catalysts and may more effectively decompose the perfluorinated compounds than the previous catalysts. Thus, catalyst costs may be reduced, and the emission of greenhouse gas including perfluorinated compounds may be reduced.

Operation S230, which may include post-processing the gas to be processed, the gas including the perfluorinated compound, may be performed by using a wet method using $H_2O$ or an alkali solution, such as KOH, NaOH. Through the post-processing at operation S230, the gas including the perfluorinated compound, acid gas, such as HF, generated according to the decomposition of the perfluorinated compound, may be eliminated.

In embodiments, after the post-processing at operation S230, the gas including the perfluorinated compound, the gas to be processed, from which the perfluorinated compound is eliminated, may be finally disposed of.

As described above, example embodiments are described in the specification with reference to the drawings. The embodiments are described by using one or more terms in this specification. However, the terms are used only for the purpose of describing the inventive concept, and are not used to limit the meaning or the scope of the inventive concept described in the claims. Therefore, it may be understood by one of ordinary skill in the art that various modifications and equivalent other embodiments are possible from the description of the embodiments. Accordingly, the true technical scope of the inventive concept shall be defined by the attached claims.

While embodiments have been particularly shown and described, it will be understood that various changes in form and details may be made therein without departing from the spirit and scope of the following claims.

What is claimed is:

1. A catalyst for decomposing perfluorinated compounds, the catalyst comprising:
   an alumina carrier;
   at least one metal carried on the alumina carrier and selected from the group consisting of Zn, Ni, W, Zr, Ti, Ga, Nb, Co, Mo, V, Cr, Mn, Fe, and Cu;
   S carried on the alumina carrier; and
   one rare-earth metal carried on the alumina carrier;
   wherein the one rare-earth metal is La.

2. The catalyst of claim 1, wherein the alumina carrier and the at least one metal form a compound oxide.

3. The catalyst of claim 1, wherein the at least one metal is Zn.

4. The catalyst of claim 1, wherein a mole ratio of the alumina carrier, the at least one metal, S, and the one rare-earth metal is expressed as follows:
   100:x:y:z,
   wherein x represents a quantity of the at least one metal, y represents a quantity of S, and z represents a quantity of the one rare-earth metal, and
   wherein x is 0.1 to 50, y is 0.1 to 10, and z is 0.1 to 10.

5. The catalyst of claim 4, wherein x is 10 to 20, y is 2.5 to 5, and z is 0.1 to 0.5.

6. A method of manufacturing a catalyst for decomposing perfluorinated compounds, the method comprising:
   forming a mixture of (i) a precursor of at least one metal selected from the group consisting of Zn, Ni, W, Zr, Ti, Ga, Nb, Co, Mo, V, Cr, Mn, Fe, and Cu, (ii) a precursor of S, (iii) a precursor of one rare-earth metal, wherein the one rare-earth metal is La, and (iv) a precursor of Al;
   aging the mixture;
   drying the mixture; and
   plasticizing the mixture to manufacture a catalyst of claim 1.

7. The method of claim 6, wherein the precursor of Al includes at least one from among boehmite, pseudo-boehmite, Al alkoxide, Al nitrate, Al fluoride, Al phosphate, and Al chloride.

8. The method of claim 6, wherein the precursor of the at least one metal includes at least one from among metal nitride, metal nitrate, metal chloride, metal bromide, metal sulfide, metal sulfate, and metal phosphate.

9. The method of claim 6, wherein the precursor of S includes at least one from among sulfonic acid, ammonium sulfate, and diammonium sulfate.

10. The method of claim 6, wherein the precursor of the one rare-earth metal includes at least one from among La nitrate, La sulfate, La nitride, La chloride, La sulfide, and La bromide.

11. The method of claim 6, wherein the aging of the mixture is performed for a time of 12 hours at a temperature of 20° C. to 100° C.

12. The method of claim 6, wherein the aging of the mixture includes peptization.

13. The method of claim 6, wherein the drying of the mixture is performed for a time of 6 hours to 12 hours at a temperature of 50° C. to 200° C.

14. The method of manufacturing the catalyst for decomposing perfluorinated compounds of claim 8, wherein the plasticizing of the mixture is performed for a time of 6 hours to 12 hours at a temperature of 700° C. to 900° C.

15. An apparatus for decomposing perfluorinated compounds, the apparatus comprising:
   a first processing device configured to pre-process a gas to be processed;
   a reactor including a heating portion and a catalyst portion, wherein the heating portion is configured to apply heat to the gas, and the catalyst portion includes a catalyst for decomposing perfluorinated compounds, wherein the reactor is configured to decompose a perfluorinated compound included in the gas, after the gas passes through the first processing device; and
   a second processing device configured to post-process the gas after the gas passes through the reactor,
   wherein the catalyst portion includes:
   an alumina carrier;
   at least one metal carried on the alumina carrier and selected from the group consisting of Zn, Ni, W, Zr, Ti, Ga, Nb, Co, Mo, V, Cr, Mn, Fe, and Cu;
   S carried on the alumina carrier; and
   rare-earth metals carried on the alumina carrier,
   wherein a mole ratio of the alumina carrier, the at least one metal, S, and the rare-earth metals of the catalyst portion is expressed as follows:
   100:x:y:z,
   wherein x represents a quantity of the at least one metal, y represents a quantity of S, and z represents a quantity of the rare-earth metals, and
   wherein x is 10 to 20, y is 2.5 to 5, and z is 0.1 to 0.5.

16. The apparatus for decomposing perfluorinated compounds of claim 15, wherein the catalyst portion includes the alumina carrier, Zn, S, and La.

* * * * *